(No Model.)

4 Sheets—Sheet 1.

J. B. HURD & H. H. McLANE.
CULTIVATOR AND COTTON CHOPPER.

No. 419,333.   Patented Jan. 14, 1890.

Witnesses:
M. A. Hurd
E. M. C. Nichols

Inventor:
Judson B. Hurd
Hiram H. McLane
per J. B. Hurd
Attorney (No Model.) 4 Sheets—Sheet 2.

J. B. HURD & H. H. McLANE.
CULTIVATOR AND COTTON CHOPPER.

No. 419,333. Patented Jan. 14, 1890.

(No Model.)
4 Sheets—Sheet 3.

J. B. HURD & H. H. McLANE.
CULTIVATOR AND COTTON CHOPPER.

No. 419,333. Patented Jan. 14, 1890.

Witnesses:
M. A. Hurd
E. M. C. Nichols

Inventor:
Judson B. Hurd
Hiram H. McLane
per J. B. Hurd
Attorney (No Model.) 4 Sheets—Sheet 4.

J. B. HURD & H. H. McLANE.
CULTIVATOR AND COTTON CHOPPER.

No. 419,333. Patented Jan. 14, 1890.

Witnesses:
M. A. Hurd.
E. M. E. Nichols.

Inventor:
Judson B. Hurd.
Hiram H. McLane
per J. B. Hurd
Attorney.

UNITED STATES PATENT OFFICE.

JUDSON B. HURD AND HIRAM H. McLANE, OF SAN ANTONIO, TEXAS.

CULTIVATOR AND COTTON-CHOPPER.

SPECIFICATION forming part of Letters Patent No. 419,333, dated January 14, 1890.

Application filed September 28, 1889. Serial No. 325,735. (No model.)

*To all whom it may concern:*

Be it known that we, JUDSON B. HURD and HIRAM H. McLANE, citizens of the United States, residing at San Antonio, in the county of Bexar and State of Texas, have invented a new and useful Improvement in Cultivators and Cotton-Choppers, of which the following is a specification.

Our invention relates to improvements in cultivators and choppers that are designed to cultivate entirely around the hill and thin out the plants in the row; and the objects of our improvements are, first, to provide flexible revolving knives or hoes, and, second, to afford facilities for supporting the cultivating and chopping device when out of the ground without throwing more weight behind the axle on the main wheels to tip the end of the pole against the horses' necks. We obtain these objects by the mechanism illustrated in the accompanying drawings, in which—

Figure 1:
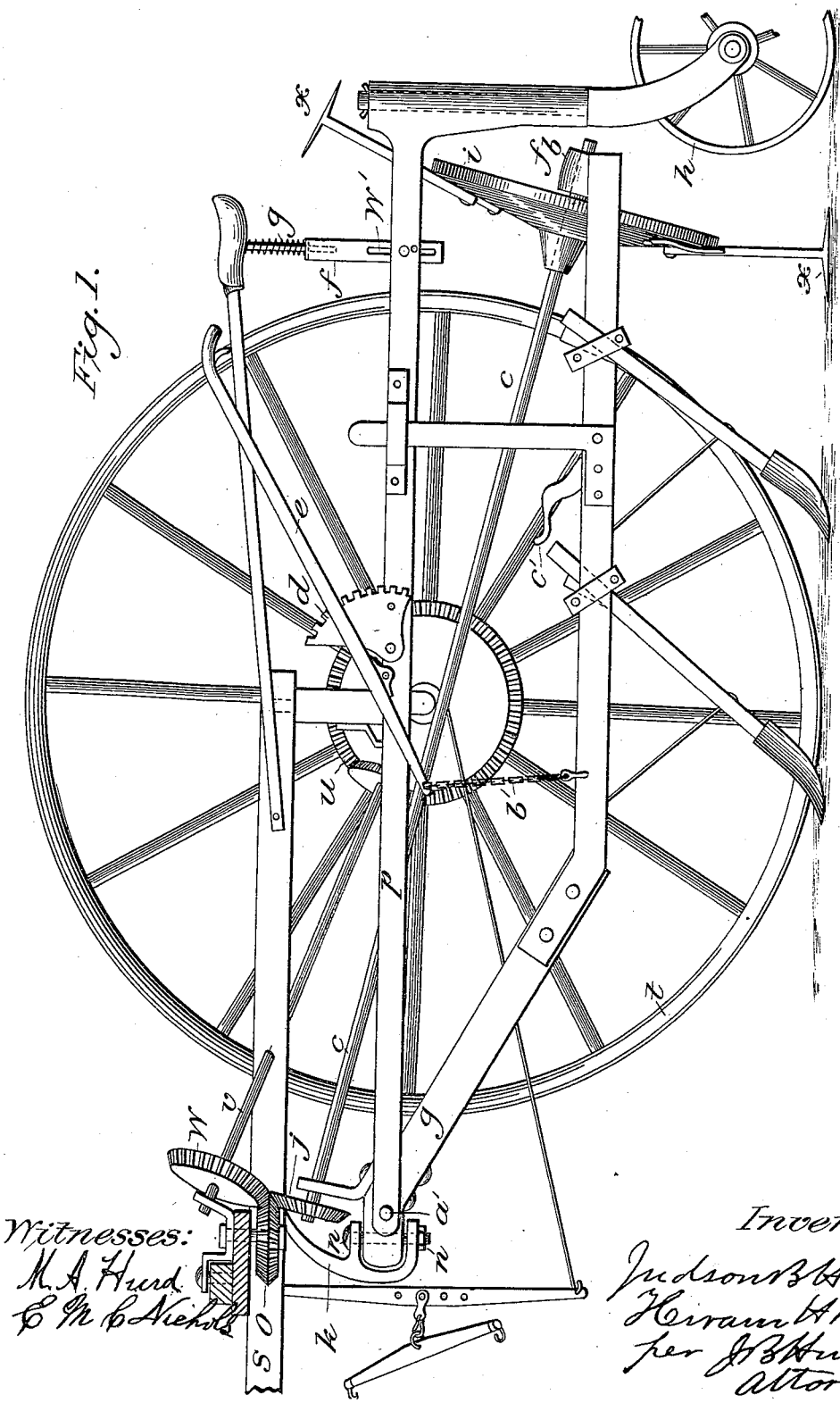
Figure 2:
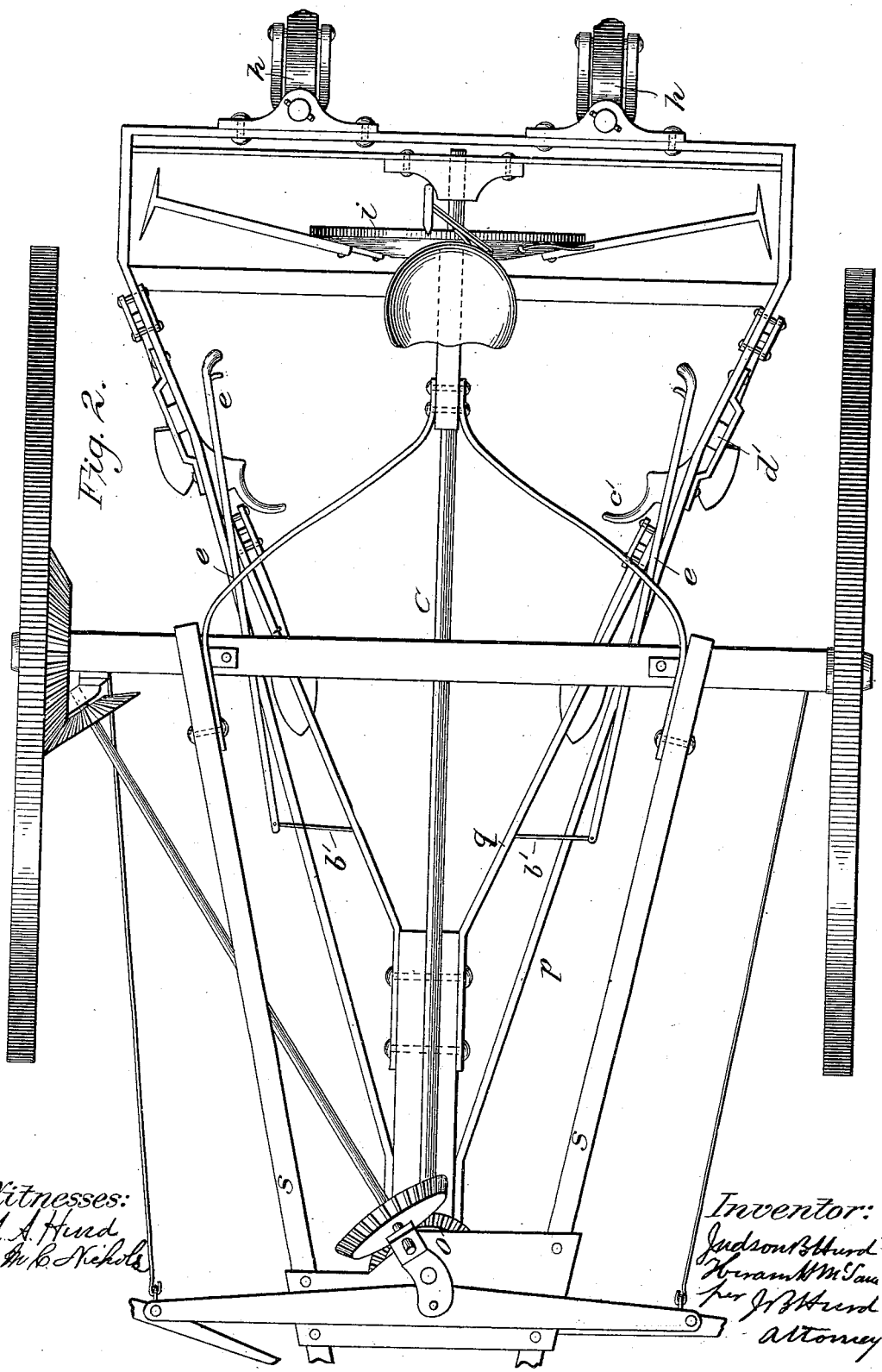
Figure 3:
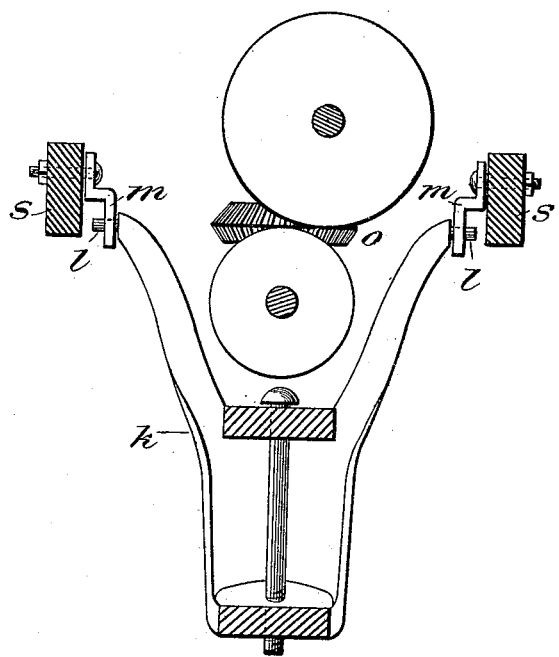

Figure 1 is a side view of one of the main wheels of our cultivator with one part of the forked pole or tongue with our cultivating-frame and chopping-frame attached. Fig. 2 is a top view of the entire machine. Fig. 3 is a rear view of the connecting-joint and front gear-wheels, showing their position in relation to each other and how the joint is attached to the tongue. Figs. 4, 5, 6, and 7 are modifications of our flexible revolving blade.

Similar letters refer to similar parts throughout the several views.

Heretofore in the so-called "cotton-choppers," wherein the knives are made to revolve over the row and cut across it in order to thin out the plants, the knife-shanks have been rigid, having no way to adjust themselves to unevenness in the surface of the ground. This class of choppers has been found objectionable in use, for the reason that in ordinary cotton-fields there is more or less variation in the height of the row without always a corresponding variation in elevation between the rows where the wheels run, so that the wheels do not form a good gage for the knives, and much of the time they are liable to cut too deep or too shallow, or not cut at all. Even in those implements where the knives are intended to be under the control of the operator the case is not much better, as it is impossible for him to tell when a wheel will run over a clod or into a hole.

It is known to be a well-established fact that the cultivation of small cotton must be very shallow immediately by the plant, and must be done by scraping the surface by a hand-hoe or by some implement with a similar movement to produce the same results. By the use of a flexible blade-shank we overcome the objections that have made horse-power cotton-choppers, hoeing-machines, &c., heretofore impracticable. By adjusting the springs or weights to give the amount of pressure required to suit the character of soil to be worked the knives are made to adjust themselves to the unevenness of the ground and scrape the surface at a uniform depth.

A pair of ordinary cultivator-wheels—say about four feet high—with an arched axle-beam and two pieces forming a forked tongue or draft-frame, together with the seat-frame, and the means for hitching the team are made use of. These are all of the ordinary pattern and are not claimed by us.

Under the draft-frame, a little forward the wheels, is suspended the forward end of two frames $p$ and $q$, one above the other and both extending rearwardly beyond the seat. The under one of these frames is adapted to carry cultivator shovels or blades of any desired pattern, and has on its rear cross-piece a boxing or bearing $b$, for the reception of the end of the shaft $c$. The other frame carries the toothed segment $d$, the lever $e$, the arch $f$, and springs $g$, for the support of the seat, and is supported itself at the rear end by the caster-wheels $h\,h$. The shaft $c$ carries at its rear end the knife-supporting frame or disk $i$ and at the other end the beveled gear-wheel $j$.

The joint $k$, which is used to attach the two frames to the draft-frame pieces $s\,s$, is formed, as shown in Fig. 3, with two arms, having each a pivot $l$ at the end, which pivots have a loose bearing in the ears $m\,m$, forming a horizontal axis by which the frames are allowed a free vertical movement, each of these ears $m\,m$ being bolted onto one of the pieces $s\,s$ of the draft-frame. The lower part of the joint $k$ has a vertical axis at the bolt $n$, which allows the frames a free lateral movement. These two axes of the joint $k$ are made to cross each other at right angles at the point where the beveled gear-wheel $j$ meshes with the double gear-wheel $o$. By this construction and arrangement it will be seen that as the wheel $j$ moves with the frames $p$ and $q$ and swing on the axis at $n$, and as the wheel $o$ has a vertical axis also passing through $n$, the lateral movement of the frames will not throw the wheels $j$ and $o$ out of gear, and if the cogs of these wheels $j$ and $o$ are a little rounded the vertical movement of the frames $p$ and $q$ can be effected also without interfering with the working of this gearing. So, it will be seen that the motion of the large wheel $t$ will be conveyed through the beveled gearing at $u$, the shaft $v$, the wheels $w$, $o$, and $j$, and the shaft $c$ and cause the blade-carrying disk $i$ to revolve and carry the knives K across the row of plants, and the lateral or vertical motion that it may be necessary to give these frames to keep them over the row will not interfere with this revolution of the blades.

The joint $k$, used for the purpose herein specified, is claimed by us in another application for cotton-chopper, filed September 6, 1889, Serial No. 323,213.

The frame $p$ is pivotally attached to the front of the frame $q$ by means of the transverse bolt $a'$; but the frame $q$ has its vertical motion from the horizontal axis of the joint $k$. A lifting-lever which is pivoted to the frame $p$ on each side is connected at its forward end with the frame $q$ by means of a chain $b'$. These levers are adapted to engage with toothed segments, so that the frame $q$ can be easily set higher or lower at any moment by the operator, or the cultivator-shovels and hoeing-blades can be carried entirely above the ground and supported by the caster-wheels, instead of having their weight thrown behind the axle of the large wheels, which would cause the forward end of the draft-frame to tip up against the horses' necks. These caster-wheels also serve to make the frames more easily controlled in their lateral movements by the operator's feet, and to further serve this purpose the frame $q$ is provided on each side with a foot-rest $c'$ and a vertically-projecting arm $d'$, which arms pass through slots formed on the outside of the frame $p$, whereby the two frames in their lateral movements are made to move together.

On the rear end of the shaft $c$ is rigidly secured the wheel or disk to which are attached the flexible blades of either style shown in the drawings, or of any other style or pattern which embraces this general principle of construction, the controlling feature of each and all of them being a cutting knife or hoe fixed to a shank or handle, this shank or handle being pivotally connected with a support that revolves. This pivotal connection, which forms one axis of motion for the hoe or knife, is arranged to be in advance of the hoe or knife when it strikes the ground in its course across the row of plants, and in conjunction with this is a spring or weight which presses the hoe or knife upon the surface of the ground and gives to it a degree of vertical flexibility whereby it may adjust itself to any unevenness in the surface of the ground.

Our improvement involves a radical departure in the construction of cotton-choppers and other implements of that class, the invention consisting, broadly, in a chopper provided with a revolving hoe or hoes, and knife or knives, with a shank that gives it a degree of flexibility whereby it may vary up and down with the surface of the ground.

Flexible blades have been used by us heretofore in cotton-choppers; but they, being adapted for an oscillating motion, differ from these, which are revolving flexible blades.

We are aware that caster-wheels have been used to support cultivator-frames; but the purposes served by the use of our caster-wheels in this connection are different.

In our implement, as in many other cultivators, the seat is arranged for the operator to sit where his weight will nearly balance the weight of the draft-frame, leaving just weight enough on the neck-yoke to hold it in position. Now, when the cultivator-frames are raised clear of the ground for the purpose of turning around or in traveling to or from the field, if their weight is thrown on the same wheels that carry the operator, they will destroy the balance and cause the draft-frame to tip up and the operator to balance down, making it unpleasant both for him and the team. We, by throwing the weight of the cultivator-frames onto the caster-wheels, leave the balance between the draft-frame and the operator undisturbed, and to further provide against the operator being tipped down in any case, as in driving up hill or the like, the frame $p$ is provided with an arched cross-piece, each end of which is provided with a longitudinal slot $w'$ for the bolts that secure it to the sides of the frame, in order to give it vertical adjustability. In the center of this arch is a hole, through which a bolt that projects rigidly downward from the seat passes. Around this bolt is placed a spiral spring G, adapted to support the weight of the operator.

Figure 4:
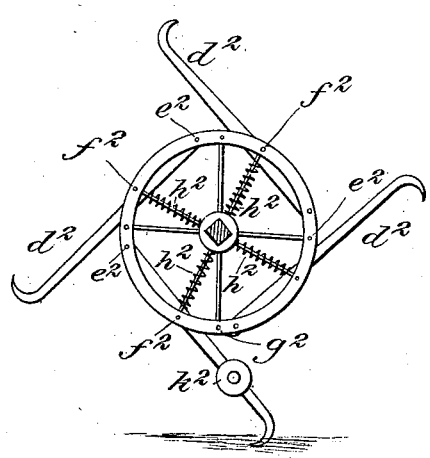
Figure 5:
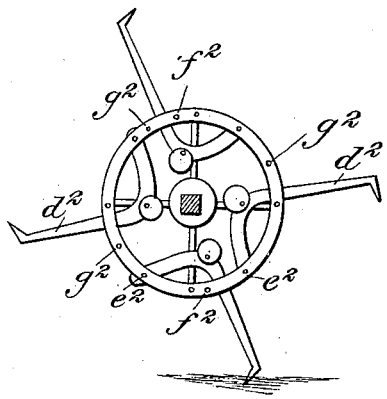
Figure 6:
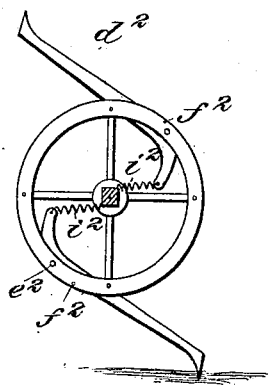

In Figs. 4, 5, and 6 is shown a wheel or frame for the support of the hoe or blade shanks. These wheels or frames are provided with an extra rim, which is bolted to the main rim; but by the use of washers or shoulders on the bolts the two rims are left a short distance apart, forming an almost continuous slot in the face of the wheel or frame. In this slot the shanks $d^2$ of the hoes or blades are placed and have a free movement. These shanks are pivotally attached to the double rim at $e^2$, and while they are held from swinging too far out of the slot by the bolts $f^2$ they are held from swinging too far the other way by the bolts $g^2$, placed through the rims on the other side of the shanks. In Fig. 4 the shanks are held normally against the bolts $f^2$ by means of the spiral springs $h^2$, which are strung on a double wire or kept in position by any suitable means. In Fig. 6 the shanks are held normally against the bolts $f^2$ by the use of pulling-springs $i^2$.

Figure 7:
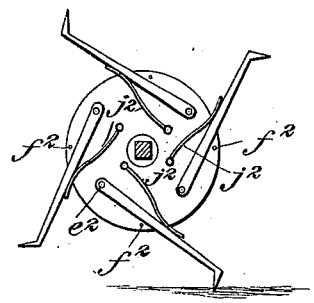

In Fig. 7 a solid wheel or disk is used, and the shanks are held in their normal position by flat springs $j^2$.

In Fig. 5 the shanks are shown to be bent nearly at right angles, and a weight consisting of a ball of iron or the like is secured to the shank to press it against the ground, instead of a spring, as in the other forms.

In Fig. 4 the weight $k^2$ is shown on one of the shanks, showing how it may be used on a straight shank, in which case the springs may be left off.

When weights are used, the hoes or knives are made to press more or less against the ground by shifting the weight nearer to or farther from the hoe or knife. So might the construction of these revolving flexible hoes or knives be varied almost indefinitely; but it will be seen that they each have a shank that moves from a pivot or joint, (marked $e^2$,) and this center of motion or axis on which the shank immediately moves is arranged so as to be in advance of the hoe or knife in its course across the row; and this principle of construction is essential in a revolving hoe or knife to produce the result desired. To carry the hoes or knives, the solid wheel or disk, as shown in Fig. 7, is preferably used in this machine, and is thus shown in Figs. 1 and 2.

Having fully described our invention, we claim as new and desire to secure by Letters Patent—

1. In cotton-choppers, cultivators, and the like, a flexible revolving hoe or knife not limited to specific construction shown, but having in its construction the general and controlling features specified, a hoe or knife having a shank or its equivalent that is pivotally attached to a revolving disk or frame or other support, the pivot, hinge, or the like which connects the shank with said frame or support, forming an axis or center of motion for the shank and hoe or knife, which center of motion is arranged to go in advance of the hoe or knife in its course across the row of plants, and a spring or weight operating upon said shank to cause the hoe or knife to adjust itself to the unevenness of the ground.

2. In cotton-choppers, cultivators, and the like, the combination, with rotary hoes or knives that are arranged to have a degree of vertical flexibility when they strike the ground, of a joint that supports the forward end of the chopping or cultivating device and is arranged to allow said device free lateral and vertical motion independent of the driving-wheel, at the same time the action of the driving-wheel imparting a rotary motion to the hoes or knives, substantially as set forth, and for the purposes specified.

JUDSON B. HURD.
HIRAM H. McLANE.

Witnesses:
W. W. TEELE,
L. D. DIBBLE.